US008566538B2

(12) United States Patent
Bates et al.

(10) Patent No.: US 8,566,538 B2
(45) Date of Patent: Oct. 22, 2013

(54) ADMINISTERING THERMAL DISTRIBUTION AMONG MEMORY MODULES WITH CALL STACK FRAME SIZE MANAGEMENT

(75) Inventors: Cary L. Bates, Rochester, MN (US); Nicholas P. Johnson, Rochester, MN (US); Justin K. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 13/210,509

(22) Filed: Aug. 16, 2011

(65) Prior Publication Data

US 2013/0046952 A1    Feb. 21, 2013

(51) Int. Cl.
*G06F 12/00* (2006.01)
(52) U.S. Cl.
USPC .......................................... 711/147; 711/165
(58) Field of Classification Search
USPC ................................................ 711/147, 165
See application file for complete search history.

(56) References Cited

U.S. PATENT DOCUMENTS

| 5,502,838 | A  | 3/1996  | Kikinis      |
| 7,191,088 | B1 | 3/2007  | Reed et al.  |
| 2007/0257359 | A1 | 11/2007 | Reis et al.  |

OTHER PUBLICATIONS

Basten et al., "Thermal-Aware Scratchpad Memory Design and Allocation," *2010 IEEE International Conference on Computer Design (ICCD)*, Oct. 3, 2010, pp. 1-7, Digital Object Identifier: 10.1109/ICCD.2010.5647616, The Netherlands.
Kim et al., "Temperature-Aware Compilation for VLIW Processors," *13th IEEE Conference on Embedded and Real-time Computing Systems and Applications (RTCSA 2007)*, pp. 426-431, Aug. 2007, Korea.
Atienza et al., "Thermal-Aware Data Flow Analysis," *Design Automation Conference*, 2009 (*DAC '09. 46th ACM/IEEE*, Jul. 2009, pp. 613-614, San Francisco, California, USA.
Atienza et al., "Thermal-Aware Compilation for System-On-Chip Processing Architectures," *Proceedings of the 20th Symposium on Great Lakes Symposium on VLSI*, Digital Object Identifier: 10.1145/1785481.1785535, May 2010, pp. 221-226, Providence, Rhode Island, USA.
Orailoglu et al., "Processor Reliability Enhancement Through Compiler-Directed Register File Peak Temperature Reduction," *IEEE/IFIP International Conference on Dependable Systems & Networks, 2009. DSN '09*, Digital Object Identifier: 10.1109/DSN.2009.5270305, Jun. 2009, pp. 468-477, Portugal.
David et al., "Thermal Modeling and Management of DRAM Memory Systems," *ISCA '07 Proceedings of the 34th Annual International Symposium on Computer Architecture*, Digital Object Identifier: 10.1145/1273440.1250701, May 2007, pp. 312-322, New York, USA.

(Continued)

*Primary Examiner* — Matthew Bradley
(74) *Attorney, Agent, or Firm* — Biggers & Ohanian, LLP (57) ABSTRACT

Administering thermal distribution among memory modules in a computing system that includes temperature sensors, where each temperature sensor measures temperature of a memory module and thermal distribution is effected by: determining, in real-time by a user-level application in dependence upon the temperature measurements of the temperature sensors, whether a memory module is overheated; if a memory module is overheated and if a current call stack frame is stored on the overheated memory module, increasing, by the user-level application, a size of the current call stack frame to fill remaining available memory space on the overheated memory module, ensuring a subsequent call stack frame is stored on a different memory module.

12 Claims, 4 Drawing Sheets

(56) References Cited

OTHER PUBLICATIONS

Liu et al., "A Power and Temperature Aware DRAM Architecture," *DAC '08 Proceedings of the 45th annual Design Automation Conference*, Digital Object identifier: 10.1145/1391469.1391691, Jun. 2008, pp. 1-6, New York, USA.

David et al., "Software Thermal Management of DRAM Memory for Multicore Systems," *SIGMETRICS '08 Proceedings of the 2008 ACM SIGMETRICS International Conference on Measurement and Modeling of Computer Systems*, Digital Object Identifier: 10.1145/1375457.1375496, Jun. 2008, pp. 337-348, New York, USA.

ADMINISTERING THERMAL DISTRIBUTION AMONG MEMORY MODULES WITH CALL STACK FRAME SIZE MANAGEMENT

BACKGROUND OF THE INVENTION

1. Field of the Invention

The field of the invention is data processing, or, more specifically, methods, apparatus, and products for administering thermal distribution among memory modules in a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

During operation of a computer, memory modules such as Dual In-line Memory Modules (DIMMs), may generate a large amount of heat. Heat generation may cause degradation and eventually failure of DIMMs over time. Current program execution may create a disproportionate distribution of heat generation among many DIMMs or even among modules of one DIMM. That is, in a memory system that includes a number of DIMMs, a subset of the DIMMs may be accessed many more times than other DIMMs in the system. This disproportionate accessing may cause the subset of DIMMs to generate far more heat over time than other DIMMs. Such disproportionate heat generation may effect degradation of the subset of DIMMs more quickly than the other DIMMs in the system. That is, the operating life of each DIMM in the subset of DIMMs that is accessed more frequently is consumed much more quickly than the operating life of each of the other DIMMs. It would be useful, therefore, to distribute heat generation in a more balanced, even manner amongst all DIMMs in a subsystem.

SUMMARY OF THE INVENTION

Methods, apparatus, and products for administering thermal distribution among memory modules in a computing system are disclosed in this specification. The computing system includes a number of temperature sensors with each temperature sensor measuring temperature of a memory module. Administering thermal distribution among such memory modules in the computing system includes: determining, in real-time by a user-level application in dependence upon the temperature measurements of the temperature sensors, whether a memory module is overheated; and if a memory module is overheated and if a current call stack frame is stored on the overheated memory module, increasing, by the user-level application, a size of the current call stack frame to fill remaining available memory space on the overheated memory module, ensuring a subsequent call stack frame is stored on a different memory module.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
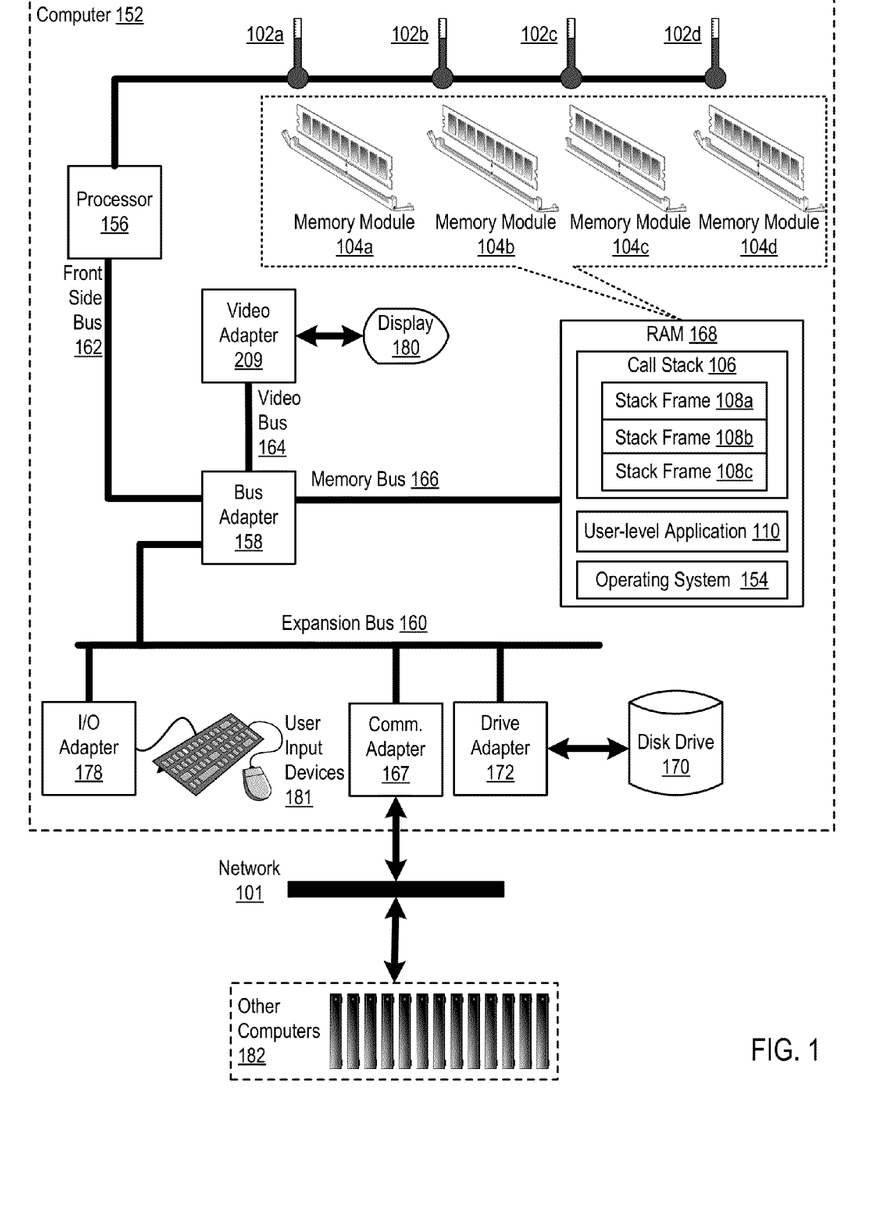
FIG. 1 sets forth a block of a system for administering thermal distribution among memory modules in a computing system according to embodiments of the present invention.

Exemplary methods, apparatus, and products for administering thermal distribution among memory modules in a computing system in accordance with the present invention are described with reference to the accompanying drawings, beginning with FIG. 1. FIG. 1 sets forth a block of a system for administering thermal distribution among memory modules in a computing system according to embodiments of the present invention. The system of FIG. 1 includes a includes an exemplary computer (152) that, in turn, includes at least one computer processor (156) or 'CPU' as well as random access memory (168) ('RAM') which is connected through a high speed memory bus (166) and bus adapter (158) to processor (156) and to other components of the computer (152). The computer in the example of FIG. 1 operates generally to administer thermal distribution among memory modules of the computer. The term 'memory module' as used in this specification refers to any unit of computer memory. In the example of FIG. 1, the computer memory—RAM (168)—is implemented with four Dual In-line Memory Modules (DIMMs) (104a, 104b, 104c, 104d). Each DIMM may be considered a separate memory module. Alternatively, each integrated circuit of computer memory on the DIMM itself may be considered a separate memory module. For ease explanation—not limitation—each DIMM (104a-104d) in the example of FIG. 1 is referred to as a separate memory module.

In the example of FIG. 1, a separate temperature sensor (102a, 102b, 102c, 102d) is associated with each DIMM (104a-104d) in that each temperature sensor measures the temperature of one DIMM. Temperature sensors are depicted in the example of FIG. 1 as components separate from the DIMMs themselves, but readers of skill in the art will recognize that such temperature sensors may be implemented in a variety of manners—on a motherboard, in or near a DIMM slot of the motherboard, on the DIMM itself, and so on. Each such implementation is well within the scope of the present invention.

The temperature sensors (102a-102d) are coupled to the processor (156) in the example of FIG. 1. In such an embodiment, the temperature sensor may store a present temperature of a memory module in a designated, well known processor register periodically or upon request, or may raise an interrupt or flag when the temperature of a memory module exceeds a predetermined threshold. The temperature sensors (102a-102d) are depicted in the example of FIG. 1 as being coupled to the processor (156) for clarity of explanation, not limitation. Readers of skill in the art will recognize that temperature sensors (102a-102d) capable of measuring temperature of a memory module may be operatively coupled in a variety of ways. For example, temperature sensors may be coupled to an expansion bus (160) through an Input/Output (I/O) adapter (178), coupled to a service processor (not shown) through an out-of-band bus, or in other ways as will occur to readers of skill in the art.

Stored in RAM (168) is a user-level application (110), a module of computer program instructions that provides user-level data processing tasks. Examples types of user-level applications include word processing applications, spreadsheet applications, database management applications, multimedia library management applications, image editing and processing applications, video editing and processing applications, and so on as will occur to readers of skill in the art.

In addition to typically provided user-level data processing tasks, the example user-level application (110) of FIG. 1 also supports administration of thermal distribution among memory modules of the computer (152) in accordance with embodiments of the present invention. When executed, the user-level application (110) causes the computer (152) to administer thermal distribution in accordance with embodiments of the present invention by: determining, in real-time in dependence upon the temperature measurements of the temperature sensors (102a-102d), whether a memory module (104a-104d) is overheated. If a memory module is overheated, the user-level application determined whether a current frame (108a, 108b, 108c) of the call stack (106) is stored on the overheated memory module.

If the current call stack frame (108a) is stored on the overheated memory module, the user-level application increases the size of the current call stack frame (108a) to fill remaining available memory space on the overheated memory module, thereby ensuring a subsequent call stack frame (108b, 108c) is stored on a different memory module.

A call stack is a stack data structure that stores information about the active subroutines of a computer program. This kind of stack is also known as an execution stack, control stack, run-time stack, or machine stack, and is often shortened to just "the stack." A call stack is used for several related purposes, but the main reason for having one is to keep track of the point to which each active subroutine should return control when it finishes executing. An active subroutine is one that has been called but is yet to complete execution after which control should be handed back to the point of call. Such activations of subroutines may be nested to any level (recursive as a special case), hence the stack structure. If, for example, a subroutine 'DrawSquare' calls a subroutine 'DrawLine' from four different places, 'DrawLine' must know where to return when its execution completes. To accomplish this, the address following the call instruction, the return address, is pushed onto the call stack with each call.

A call stack is composed of stack frames (also called activation records or activation frames). These are machine dependent data structures containing subroutine state information. Each stack frame corresponds to a call to a subroutine which has not yet terminated with a return. Call stacks in many cases are maintained in a contiguous memory region, with one stack frame following another in subsequent physical memory. Also, call stacks are typically administered with pointers, such that memory of a completely processed stack frame—a terminated subroutine—need not be freed immediately. Instead, a pointer is incremented to point to the next frame in the call stack. Many stack frames may be included in the stack at one time. Given the contiguous nature call stacks, the use of pointers rather than freeing memory, and the possibility that many separate frames are included in the call stack at one time, increasing the current stack frame to fill available memory on the overheated memory module will, in most cases, cause other stack frames lower in the stack to be pushed onto another memory module and any newly added stack frames to be created and stored on another memory module.

Once a subsequent call stack frame (108b, 108c) is stored on a different, cooler memory module, accesses to that call stack frame will be directed to the different, cooler memory module rather than the overheated memory module. That is, the number of accesses to the overheated memory module will be reduced, shifted to another memory module. Because accesses to a memory module generate heat and the number of accesses to the overheated memory module is reduced, the amount of heat generated by the overheated memory module is also reduced.

Even in memory systems that operate with memory interleaving, multiple accesses to a single memory module may occur. Increasing the stack frame size when a memory module has overheated ensures that memory module accesses in such systems may be distributed among many memory modules, thereby distributing thermal distribution among the memory modules.

Also stored in RAM (168) is an operating system (154). Examples of operating systems that support administering thermal distribution among memory modules according to embodiments of the present invention include UNIX™, Linux™, Microsoft XP™, AIX™, IBM's i5/OS™, and others as will occur to those of skill in the art. The operating system (154), user-level application (110), and call stack (106) example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support administering thermal distribution among memory modules according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support administering thermal distribution among memory modules according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
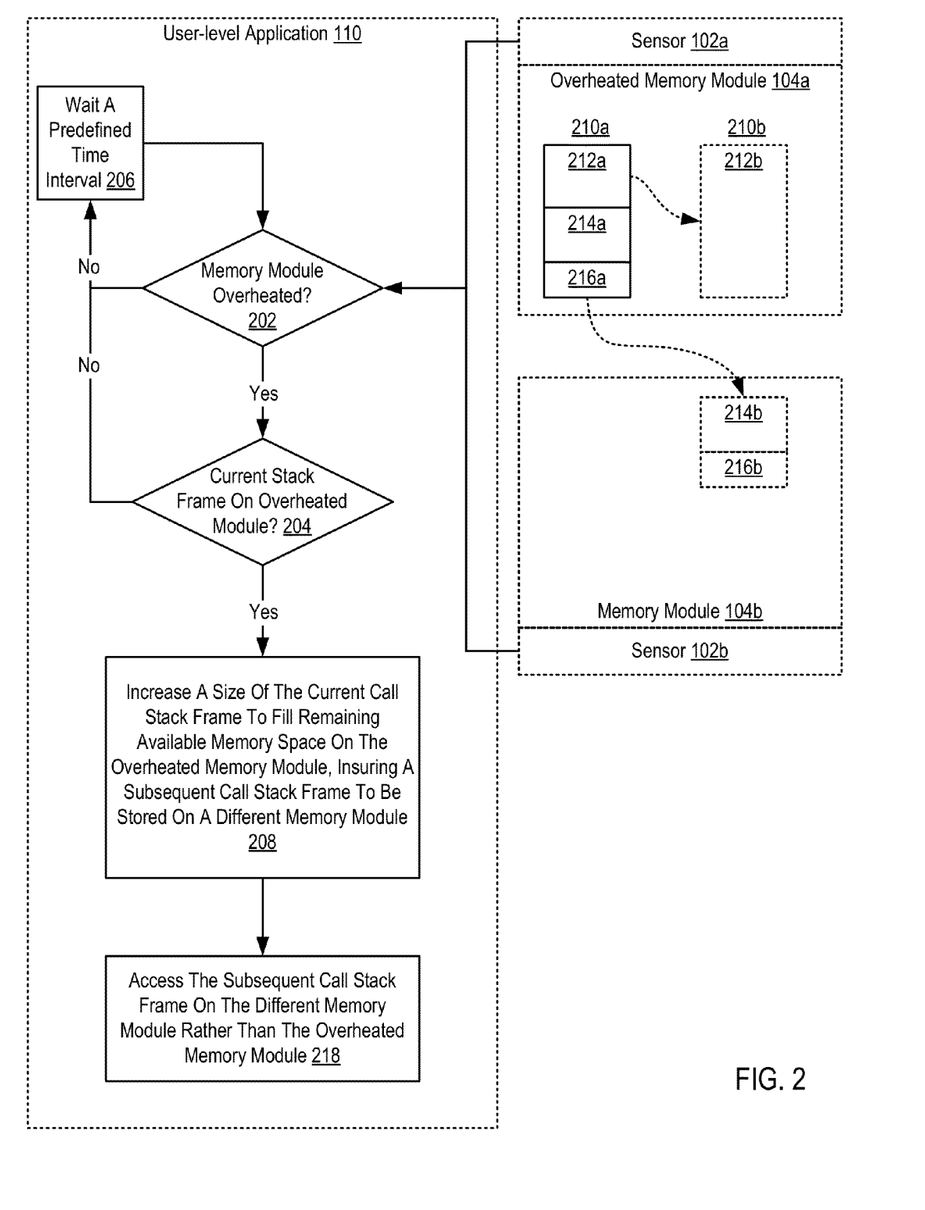
FIG. 2 sets forth a flow chart illustrating an example method for administering thermal distribution among memory modules in a computing system according to embodiments of the present invention.

For further explanation, FIG. 2 sets forth a flow chart illustrating an example method for administering thermal distribution among memory modules (104a, 104b) in a computing system according to embodiments of the present invention. In the method of FIG. 2, the computing system includes a number of temperature sensors (102a, 102b), each of which measures temperature of a memory module (102a, 102b).

The method of FIG. 2 includes determining (202), in real-time by a user-level application (110) in dependence upon the temperature measurements of the temperature sensors (102a, 102b), whether a memory module is overheated. The phrase 'in real-time' in this specification refers to action carried out during execution of the application program, without a request form a user. That is, the application (110) itself includes computer program instructions that carry out—without user interaction and during execution of the application (110)—the determination (202).

Determining (202) whether a memory module is overheated may be carried out in various ways depending on the implementation of the temperature sensors. In embodiments in which the temperature sensors (102a, 102b) are configured to interrupt the processor when a memory module's temperature exceeds a threshold, the application (110) may provide an interrupt handler that identifies the memory module responsive to such an interrupt. In embodiments in which each temperature sensor periodically stores a present temperature of a memory module, the user-level application (110) may retrieve the contents of that register periodically and determine whether the value stored in the register is greater than a predefined threshold. Readers of skill in the art will recognize that these are but two ways among many possible ways to determine (202) whether a memory module is overheated.

If no memory module is overheated, the method of FIG. 2 continues by waiting (206) a predefined period of time and determining (202) again, whether a memory module is overheated. That is, determining (202) whether a memory module is overheated in the example of FIG. 2 is carried out periodically at a predefined interval of time until a memory module is overheated.

If a memory module is overheated, the method of FIG. 2 continues by determining (204) whether a current stack frame is stored on the overheated memory module. Determining (204) whether a current stack frame is stored on the overheated memory module may be carried out by resolving a call stack pointer referencing the current stack frame to a virtual address and requesting, from the operating system, that the virtual address be translated to a physical address. From information describing physical address to memory module mappings of the computing system, the user-level application (110) may then determine whether the physical address of the pointer referencing the current call stack frame (212a) is an address of the overheated memory module (104a). If the physical address is an address of the overheated memory module (104a), the current call stack frame (212a) is stored on the overheated memory module (104a).

Information describing physical address to memory module mappings of the computing system may be obtained by the user-level application (110) in a number of different ways. For example, the user-level application (110) may request such information from an operating system through an operating system level function call. In another example, the user-level application may retrieve such information directly from the non-volatile memory of the memory modules, where the information is stored at boot time of the computing system.

If a current call stack frame (212a) is stored on the overheated memory module, the method of FIG. 2 continues by increasing (208), by the user-level application, a size of the current call stack frame (212a) to fill remaining available memory space on the overheated memory module, ensuring a subsequent call stack frame is stored on a different memory module. Increasing (208) a size of a current call stack frame may be carried out in a variety ways including, for example, with a call to an operating system function designating for increasing the size of a frame in a call stack. In unix-style operating systems, for example, the function call 'alloca( )' allocates a memory region of a particular size (specified as a parameter of the function call) within the current stack of the call stack. The return of the function call is a pointer to the allocated memory region in the frame.

For clarity of explanation, the example call stack (210) in the method of FIG. 2 is depicted in a before-and-after format where call stack (210a) depicts the call stack prior to increasing the size of the current call stack frame and call stack (210b) depicts the call stack in dashed lines after increasing the size of the current call stack frame. The call stack (210) includes a current call stack frame (212) and two subsequent call stack frames (214, 216). When the current call stack frame (212a) is increased in size—depicted as current call stack frame (212b)—the subsequent call stack frames (214a, 216a) are then pushed to another, different memory module (104b)—depicted as frames (214b, 216b).

The method of FIG. 2 also includes accessing (218) the subsequent call stack frame (214b, 216b) on the different memory module (104b) rather than the overheated memory module (104a). Each memory access generates some amount of heat. By accessing (218) the subsequent call stack frames (214b, 216b) on a memory module (104b) other than the overheated memory module (104a), heat is generated in the other memory module (104b), rather than the overheated memory module (104b).

Figure 3:
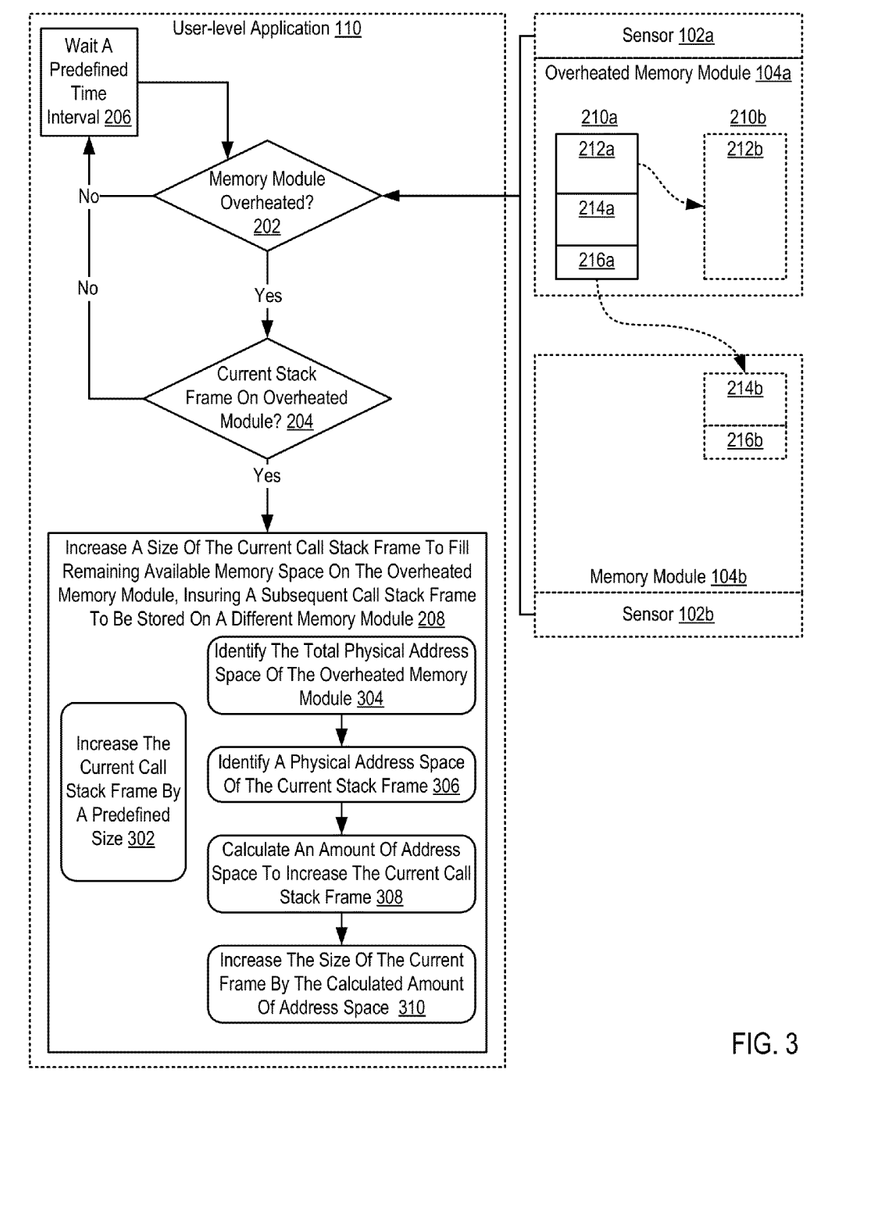
FIG. 3 sets forth a flow chart illustrating a further example method for administering thermal distribution among memory modules in a computing system according to embodiments of the present invention.

For further explanation, FIG. 3 sets forth a flow chart illustrating a further example method for administering thermal distribution among memory modules (104a, 104b) in a computing system according to embodiments of the present invention. The method of FIG. 3 is similar to method of FIG. 2 in that, in the method of FIG. 3, the computing system includes a number of temperature sensors (102a, 102b), each of which measures temperature of a memory module (102a, 102b), and the method includes determining (202) whether a memory module is overheated; if so, determining (204) whether a current call stack frame is stored on the overheated memory module; and, if so, increasing (208) a size of the current call stack frame to fill remaining available memory space on the overheated memory module, thereby ensuring a subsequent call stack frame is stored on a different memory module.

The method of FIG. 3 differs from the method of FIG. 2, however, in that FIG. 3 illustrates two alternative methods of increasing (208) a size of the current call stack frame. In the method of FIG. 3, for example, increasing (208) a size of the current cal stack frame may include increasing (302) the current call stack frame by a predefined size. That is, the user-level application (110) may be configured to increase the current stack frame by the same, predefine size regardless of the physical location of current stack frame in the overheated memory module, the size of current stack frame in the overheated memory module, the amount of available memory space in the overheated memory module, and so on. Consider, for example, that a user-level application is configured to increase the size of the current stack frame by 1.5 Gigabytes (GB) in a computing system in which memory modules are 1 GB in size. In each instance of increasing the call stack frame's size, the user-level application will necessarily push subsequent frames onto another memory module.

In another example of increasing (208) a size of the current call stack frame, the method of FIG. 3 includes identifying (304) the total physical address space of the overheated memory module; identifying (306) a physical address space of the current stack frame, and calculating, (308) in dependence upon the total physical address space of the overheated memory module and the physical address space of the current stack frame, an amount of address space to increase the current call stack frame. Consider, for example, that the overheated memory module is 1 GB in size, the current call stack frame is located halfway in the overheated memory module, 512 Megabytes (MB) from the memory module's initial memory address, and the current call stack frame is 100 MB in size. In this example, calculating (308) the amount of address space to increase the current call stack frame may be carried out by determining the amount of address space after the end of the call stack frame. From the initial address of the current stack frame, only 512 MB of address space remain: 1 GB (the size of the memory module)–512 MB (space between initial memory address of memory module and initial address of the stack frame). As the stack frame is 100 MB in size, only 412 MB remains on the memory module. Increasing the stack frame by 412 MB or more, therefore, will in most cases cause subsequent stack frames to be stored on another memory module.

Figure 4:
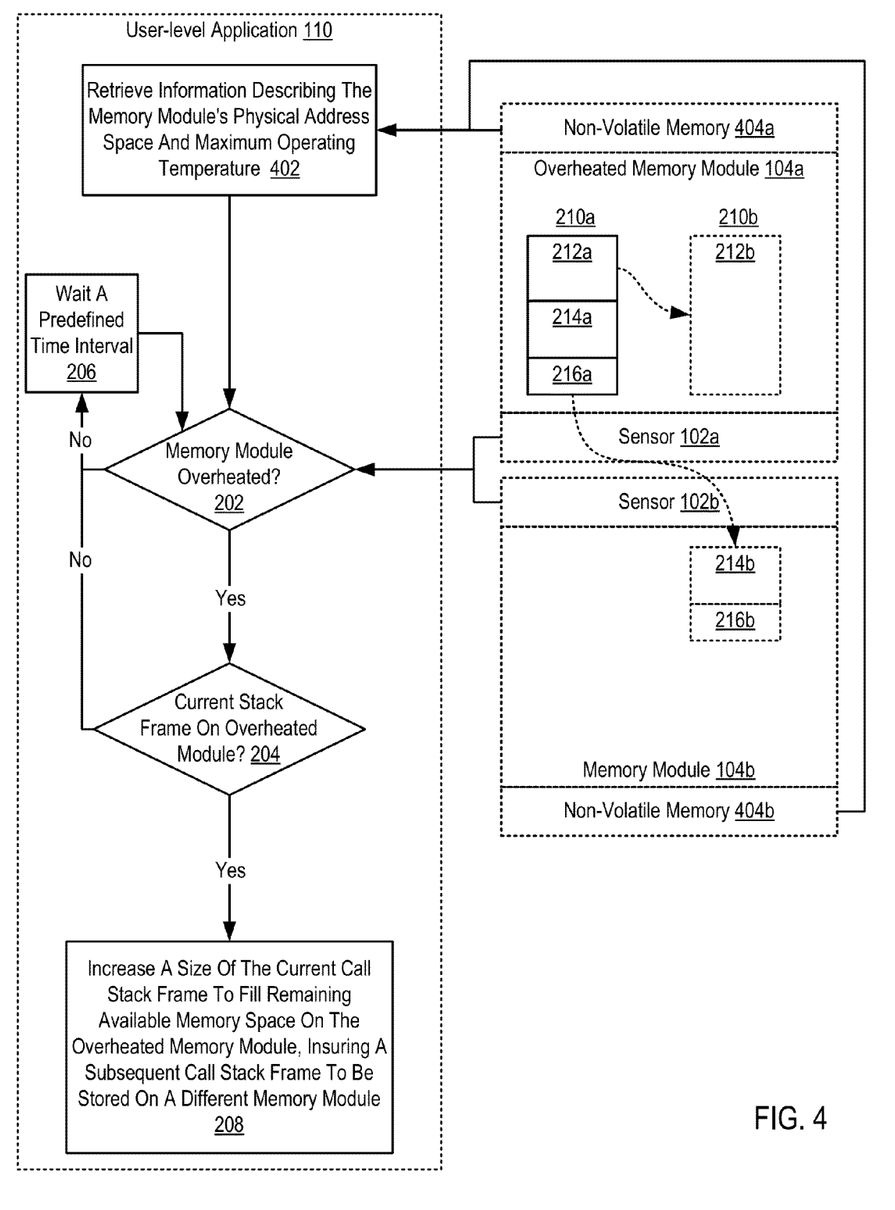
FIG. 4 sets forth a flow chart illustrating a further example method for administering thermal distribution among memory modules in a computing system according to embodiments of the present invention.

For further explanation, FIG. 4 sets forth a flow chart illustrating a further example method for administering thermal distribution among memory modules (104a, 104b) in a computing system according to embodiments of the present invention. The method of FIG. 4 is similar to method of FIG. 2 in that, in the method of FIG. 4, the computing system includes a number of temperature sensors (102a, 102b), each of which measures temperature of a memory module (102a, 102b), and the method includes determining (202) whether a memory module is overheated; if so, determining (204) whether a current call stack frame is stored on the overheated memory module; and, if so, increasing (208) a size of the current call stack frame to fill remaining available memory space on the overheated memory module, thereby ensuring a subsequent call stack frame is stored on a different memory module.

The method of FIG. 4 differs from the method of FIG. 2, however, in that the method of FIG. 4 begins by retrieving (402), by the user-level application (110) from non-volatile memory (404a, 404b) of each memory module (104a, 104b), information describing the memory module's physical address space and maximum operating temperature. Information describing the memory module's physical address space may be implemented in a variety of ways. The information may describe the physical address of a memory module in terms of size. A 1 GB memory module, for example, may store in the memory module's non-volatile memory, information specifying the size of the memory module: 1 GB. In other embodiments, information describing the physical address space of a memory module may include the physical memory addresses assigned to the memory module—the addresses used by the operating system to read data from and write data to the memory modules. Such information may be stored in the memory module's non-volatile memory Information describing the maximum operating temperature of the memory module may be stored in non-volatile memory of the memory module by the memory module's vendor. In some embodiments, the information is stored as Vital Product Data ('VPD'). The temperature may be used as a threshold against which present temperature is compared to determine (202) whether a memory module is overheated. In view of the explanations set forth above, readers will recognize that the benefits of administering thermal distribution among memory modules in a computing system according to embodiments of the present invention include:

Enabling user-level software to control thermal distribution during execution, reducing the number of monitoring processes needed to control such thermal distribution and reducing the number of hardware-based temperature control devices needed in a computing system;

Distributing thermal generation and thus heat's effects over multiple memory modules in a generally balanced manner, thereby increasing the operational life-span of the memory modules; and     In computing system in which thermal distribution among memory modules is administered in accordance with a predetermined temperature that is less than a temperature at which computer cooling fans are engaged, overall power consumption of the computing system is reduced as engagement of the cooling fans is reduced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for administering thermal distribution among memory modules in a computing system, the computing system comprising a plurality of temperature sensors, each temperature sensor measuring temperature of a memory module, the apparatus comprising a computer processor and computer memory operatively coupled to the computer processor, the computer memory having disposed within it computer program instructions that, when executed by the computer processor, cause the apparatus to carry out the steps of:

determining, in real-time by a user-level application in dependence upon the temperature measurements of the temperature sensors, whether a memory module is overheated; and if a memory module is overheated and if a current call stack frame is stored on the overheated memory module, increasing, by the user-level application, a size of the current call stack frame to fill remaining available memory space on the overheated memory module, ensuring a subsequent call stack frame is stored on a different memory module.

2. The apparatus of claim 1 further comprising computer program instructions that, when executed by the computer processor, cause the apparatus to carry out the step of accessing the subsequent call stack frame on the different memory module rather than the overheated memory module.

3. The apparatus of claim 2 wherein increasing a size of the current call stack frame further comprises increasing the current call stack frame by a predefined size.

4. The apparatus of claim 2 wherein increasing a size of the current call stack frame further comprises:
   identifying the total physical address space of the overheated memory module;
   identifying a physical address space of the current stack frame; and
   calculating, in dependence upon the total physical address space of the overheated memory module and the physical address space of the current stack frame, an amount of address space to increase the current call stack frame; and
   increasing the size of the current call stack frame by the calculated amount of address space.

5. The apparatus of claim 2 further comprising computer program instructions that, when executed by the computer processor, cause the apparatus to carry out the step of retrieving, by the user-level application from non-volatile memory of each memory module, information describing the memory module's physical address space and maximum operating temperature.

6. The apparatus of claim 2 wherein determining whether a memory module is overheated further comprises determining, periodically at a predefined interval of time, whether any of the memory modules are overheated.

7. A computer program product for administering thermal distribution among memory modules in a computing system, the computing system comprising a plurality of temperature sensors, each temperature sensor measuring temperature of a memory module, the computer program product disposed upon a computer readable non-transmission medium, the computer program product comprising computer program instructions that, when executed, cause a computer to carry out the steps of:

determining, in real-time by a user-level application in dependence upon the temperature measurements of the temperature sensors, whether a memory module is overheated; and if a memory module is overheated and if a current call stack frame is stored on the overheated memory module, increasing, by the user-level application, a size of the current call stack frame to fill remaining available memory space on the overheated memory module, ensuring a subsequent call stack frame is stored on a different memory module.

8. The computer program product of claim 7 further comprising computer program instructions that, when executed, cause the computer to carry out the step of accessing the subsequent call stack frame on the different memory module rather than the overheated memory module.

9. The computer program product of claim 7 wherein increasing a size of the current call stack frame further comprises increasing the current call stack frame by a predefined size.

10. The computer program product of claim 7 wherein increasing a size of the current call stack frame further comprises:
    identifying the total physical address space of the overheated memory module;
    identifying a physical address space of the current stack frame; and
    calculating, in dependence upon the total physical address space of the overheated memory module and the physical address space of the current stack frame, an amount of address space to increase the current call stack frame; and
    increasing the size of the current call stack frame by the calculated amount of address space.

11. The computer program product of claim 7 further comprising computer program instructions that, when executed, cause the computer to carry out the step retrieving, by the user-level application from non-volatile memory of each memory module, information describing the memory module's physical address space and maximum operating temperature.

12. The computer program product of claim 7 wherein determining whether a memory module is overheated further comprises determining, periodically at a predefined interval of time, whether any of the memory modules are overheated.

* * * * *